United States Patent
Liang et al.

(10) Patent No.: US 10,341,043 B2
(45) Date of Patent: Jul. 2, 2019

(54) METHODS FOR MULTI-USER MIMO WIRELESS COMMUNICATION USING APPROXIMATION OF ZERO-FORCING BEAMFORMING MATRIX

(71) Applicants: Ping Liang, Newport Coast, CA (US); Dengkui Zhu, Wanyuan (CN); Boyu Li, Irvine, CA (US)

(72) Inventors: Ping Liang, Newport Coast, CA (US); Dengkui Zhu, Wanyuan (CN); Boyu Li, Irvine, CA (US)

(73) Assignee: RF DSP INC., Irvine, CA (US)

( * ) Notice: Subject to any disclaimer, the term of this patent is extended or adjusted under 35 U.S.C. 154(b) by 156 days.

(21) Appl. No.: 15/503,995

(22) PCT Filed: Sep. 25, 2015

(86) PCT No.: PCT/US2015/052386
§ 371 (c)(1),
(2) Date: Feb. 14, 2017

(87) PCT Pub. No.: WO2016/049543
PCT Pub. Date: Mar. 31, 2016

(65) Prior Publication Data
US 2017/0244512 A1     Aug. 24, 2017

Related U.S. Application Data

(60) Provisional application No. 62/056,489, filed on Sep. 27, 2014.

(51) Int. Cl.
*H04L 1/00* (2006.01)
*H04B 7/04* (2017.01)
(Continued)

(52) U.S. Cl.
CPC ............. *H04L 1/0003* (2013.01); *H04B 7/04* (2013.01); *H04B 7/0452* (2013.01); *H04B 7/0617* (2013.01); *H04L 1/00* (2013.01); *H04L 1/0009* (2013.01); *H04L 25/03006* (2013.01); *H04L 2025/03624* (2013.01)

(58) Field of Classification Search
CPC ............. H04W 72/1278; H04B 7/0452; H04B 7/0486; H04B 7/0639; H04B 7/0645
See application file for complete search history.

(56) References Cited

U.S. PATENT DOCUMENTS

2009/0052357 A1*  2/2009  Suo .................. H04L 5/006
                                                        370/280
2011/0116487 A1*  5/2011  Grandhi ............ H04W 72/1278
                                                        370/338

(Continued)

*Primary Examiner* — Yemane Mesfin
*Assistant Examiner* — Mon Cheri S Davenport
(74) *Attorney, Agent, or Firm* — Guosheng Wang; United States Research and Patent Firm

(57) ABSTRACT

This invention presents methods for signal detection and transmission in MU-MIMO wireless communication systems, for inverse matrix approximation error calculation, for adaptively selecting the number of multiplexed UEs in a MU-MIMO group, for adaptively choosing a modulation and channel coding scheme appropriate for the quality of MU-MIMO channels with the approximation error of matrix inverse being incorporated.

17 Claims, 3 Drawing Sheets

(51) Int. Cl.
*H04B 7/0452* (2017.01)
*H04B 7/06* (2006.01)
*H04L 25/03* (2006.01)

(56) References Cited

U.S. PATENT DOCUMENTS

2011/0274188 A1* 11/2011 Sayana ................ H04B 7/0639
    375/260
2011/0310951 A1* 12/2011 Cvijetic ............... H04B 10/548
    375/233

* cited by examiner

METHODS FOR MULTI-USER MIMO WIRELESS COMMUNICATION USING APPROXIMATION OF ZERO-FORCING BEAMFORMING MATRIX

This application claims the benefit of U.S. Provisional Application No. 62/056,489, filed on Sep. 27, 2014.

FIELD OF INVENTION

The field of invention is wireless communication, and more specifically relates to methods for signal detection and transmission in Multi-User (MU) Multiple-Input Multiple-Output (MIMO) wireless communication systems, and in particular to methods of inverse matrix approximation error calculation, of selecting the number of multiplexed User Equipment (UEs) in a MU-MIMO group, and of choosing the proper Modulation and Coding Scheme (MCS).

BACKGROUND

In a massive MIMO system [1], each Base Station (BS) is equipped with dozens to hundreds or thousands of antennas to serve tens or more UEs in the same time-frequency resource. Therefore, they can achieve significantly higher spatial multiplexing gains than conventional MU-MIMO systems, which is one of the most important advantages of massive MIMO systems, i.e., the potential capability to offer linear capacity growth without increasing power or bandwidth [1]-[3].

It has been shown that, in massive MIMO systems where the number of antennas M, e.g., M=128, is much larger than the number of antennas on served UEs K, e.g., K=16 [2],[3], Zero-Forcing (ZF) based precoding and detection methods, e.g., ZF, Regularized ZF (RZF), Linear Minimum Mean Square Error (LMMSE), can achieve performance very close to the channel capacity for the downlink and uplink respectively [2]. As a result, ZF has been considered as a promising practical precoding and detection method for massive MIMO systems [2]-[4]. Without loss of generality, hereafter it is assumed that each UE has only one antenna, thus the number of antennas on served UEs K equal to the number of served UEs.

In hardware implementation of ZF based detection or precoding methods, despite of the very large number of M, the main complexity is the inverse of a K×K matrix [2], [5], [6]. Unfortunately, for massive MIMO systems, although K is much smaller than M, it is still much larger than conventional MU-MIMO systems. As a result, in this case, the computation of the exact inversion of the K×K matrix could result in very high complexity [6], which may cause large processing delay so that the demand of the channel coherence time is not met. Hence, Neumann Series (NS) has been considered to compute an Approximate Inverse Matrix (AIM) in hardware implementation of massive MIMO systems [2], [5], [6].

For a specific resource element in a MU communication systems, e.g., a subcarrier in the frequency domain, the received baseband signal vector at the BS side is formulated as $y=Hs+n+I_{int}$ in the uplink transmission, where H is the wireless channel matrix between these K UEs and the BS, s is the transmitted signal vector, n is the hardware thermal noise and $I_{int}$ is the interference. With ZF based detection methods, the transmitted signals by the K UEs are estimated as $\hat{s}=(\hat{H}^H\hat{H}+\alpha I_K)^{-1}\hat{H}^H y$, where $\hat{H}$ is the measured channel matrix between these K UEs and the BS, $I_K$ is the identity matrix with order K, and α is a scaling factor satisfying α≥0.

Let $G=\hat{H}^H\hat{H}+\alpha I=D+E$, where D is a diagonal matrix including the diagonal elements of G and E is a hollow matrix including the off-diagonal elements of G, then the NS of $G^{-1}$ can be written as $G^{-1}=\Sigma_{n=0}^{\infty}(I_K-D^{-1}G)^n D^{-1}$. For the hardware implementation, the inverse matrix $G^{-1}$ can be approximated as $G^{-1}\approx\Sigma_{n=0}^{N-1}(I_K-D^{-1}G)^n D^{-1}$, where N is the truncation order of NS. Similarly, to obtain the precoding matrix in the downlink also involves computing the inverse matrix. As a result, extra approximation errors are introduced into the estimated signals in the uplink or the transmitted signals in the downlink and they degrade the system performance. For hardware design, there is a trade-off between the truncation order N and the tolerable error, hence N needs to be large enough to ensure the system performance, e.g., the required spectrum efficiency, while the required computation resource is kept as low as possible to reduce the computation time and/or the hardware cost. Due to these reasons, the invention provided in this patent can be used to estimate the approximation error of NS and select the system parameters adaptively, e.g., the truncation order N, the MCS, and the number of multiplexed UEs K. As a result, the system robustness can be ensured with lower hardware cost.

OBJECTS

This invention offers methods of estimating the inverse matrix approximation error and the flowchart of selecting related system parameters that can be implemented in massive MIMO systems to improve system performance.

It is an object of this invention to provide a method to calculate the Signal-to-Interference Ratio (SIR) caused by the approximation error of applying AIM in hardware implementation.

It is an object of this invention to provide methods to select the NS truncation order N and the number of multiplexed UEs K adaptively according to the SIR caused by AIM.

It is an object of this invention to provide methods to modify the Channel Quality Indicator (CQI) of each UE by incorporating the approximation error of AIM and select the proper MCS for each UE.

SUMMARY

For ZF based detection in the uplink or precoding in the downlink, the SIR caused by the approximation error of AIM is calculated for the Resource Blocks (RBs) to be detected or precoded according to the number of antennas at the BS and the number of multiplexed UEs. With this SIR, the BS can select the proper value of truncation order of NS and the number of multiplexed UEs. Moreover, the BS can modify the CQI of each UE and select the proper MCS for each UE.

BRIEF DESCRIPTION OF DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION OF PREFERRED EMBODIMENTS

Figure 1:
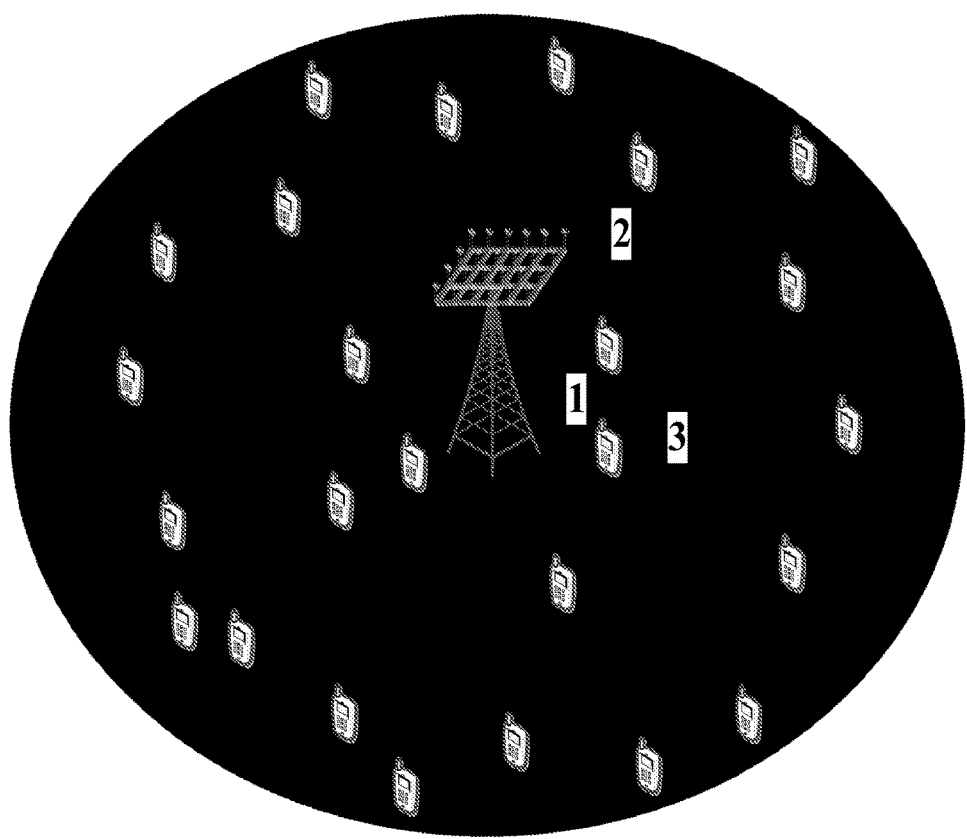
FIG. 1 illustrates a typical massive MU-MIMO communication system.

FIG. 1 presents a typical massive MU-MIMO communication system, where the BS 1 is equipped with a large number of antennas 2 to serve several UEs 3 in the same time-frequency resource. For such systems, NS can be employed to approximate the inverse matrix for ZF based detection methods in the uplink and precoding methods in the downlink. The SIR caused by approximation error of AIM with various numbers of transceiving antennas, multiplexed UEs, and truncation orders can be calculated by formulas (1)-(4) given below. Moreover, these values can be calculated off-line and stored in the memory of the BS in advance, e.g., in the form of a lookup table. For example, let M, K, and N denote the three aforementioned numbers respectively, where $N \leq 4$, then the SIR is calculated by the following formulas $$SIR_1(M, K) = \frac{\beta_1}{(K-1)B_{2,M}}, N = 1, \qquad (1)$$

$$SIR_2(M, K) = \frac{\beta_2}{(K-1)B_{3,M} + 2(K-2)(K-1)B_{2,M}^2}, N = 2, \qquad (2)$$

$$SIR_3(M, K) = \qquad (3)$$
$$\frac{\beta_3}{(K-2)(K-1)(5K-8)B_{2,M}^3 + (2K-3)(K-1)B_{3,M}B_{2,M}},$$
$$N = 3,$$

$$SIR_4(M, K) = \qquad (4)$$
$$\frac{\beta_4}{(2K-3)(K-1)B_{3,M}^2 + (2K-3)^2(K-1)^2 B_{4,M}B_{2,M} +}$$
$$(K-2)(K-1)^2 KB_{2,M}^4$$
$$N = 4,$$

where $\beta_1$, $\beta_2$, $\beta_3$ and $\beta_4$ are scaling factors which are determined by the parameters $\alpha$, M, K and N, e.g., when $\alpha=0$, then $\beta_1=\beta_2=\beta_2=\beta_4=1$.

For uplink data transmission, supposing that the number of receiving antennas is M and the number of UEs multiplexed on a specific RB is K, three methods to combat the approximation error of AIM are presented below.

Method-1

A minimal truncation order $N_{min}$, $N_{min} \leq 4$, of NS is configured in the BS. When the BS detects the signals belonging to the K UEs on a specific RB, it first finds the maximal MCS of these K UEs, which is denoted by $MCS_{max}$. Then, it compares the minimal required SINR for $MCS_{max}$ denoted by $SINR_{MCS\ max}$ and $SIR_{N_{min}}(M,K)$. If $SINR_{MCS\ max} \leq SIR_{N_{min}}(M,K)$, the BS would adopt $N_{min}$ for NS on the current RB. Otherwise, the BS would find the minimal N, $N \leq 4$, so that $SINR_{MCS\ max} \leq SIR_N(M,K)$. If the number of N that satisfies the condition cannot be found, the BS would choose N=8.

Method-2

Figure 2:
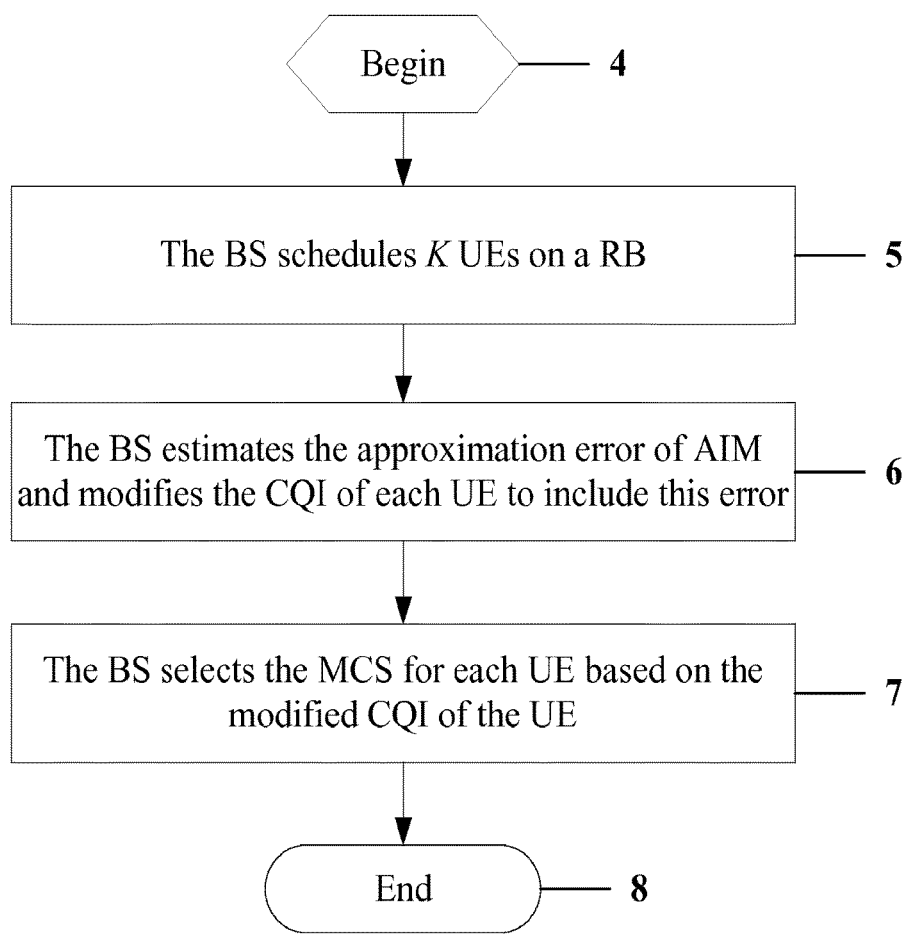
FIG. 2 illustrates the process of selecting MCS for each UE by incorporating the approximation error of AIM in the uplink.

When the BS selects the MCS for each UE multiplexed on a RB according to their CQIs, it modifies the CQI of each UE first by incorporating the approximation error of AIM. Then, it selects the MCS for each UE according to the modified CQI. For example, let $CQI_k$ denote the linear CQI value of the $k^{th}$, k=1, ..., K, UE before being modified, then the BS modifies it to $CQI_k^{New}$ according to the following formula $$CQI_k^{New} = \frac{CQI_k \times SIR_N(M, K)}{CQI_k + SIR_N(M, K)}, k = 1, \dots, K, \qquad (5)$$

where M and K denote the number of receiving antennas at the BS and the number of UEs multiplexed on a RB respectively. Finally, the BS selects the MCS for the $k^{th}$ UE according to $CQI_k^{New}$. This process is illustrated in FIG. 2, which begins 4 when the BS schedules K UEs on a RB 5. Then, when the BS selects the MCS for each UE multiplexed on this RB according to their estimated CQI, it modifies the CQI of each UE first by incorporating the approximation error of AIM 6. After that, it selects the MCS according to the modified CQI 7 before the process ends 8.

Method-3

A fixed value of truncation order N is configured for NS in the BS. For each allowable MCS in the uplink transmission, the maximal number of UEs multiplexed on a RB is calculated off-line and stored in the memory of the BS. For example, assuming $L_{UL}$ MCS levels in the uplink transmission of a wireless communication system, for the $l^{th}$ MCS, the minimal required SINR for the system specified Block Error Rate (BLER) is $SINR_l^{min}$, then the maximum number of multiplexed UE can be computed as $$K_l = \arg\ \max_k(SIR_N(M,k) \geq SINR_l^{min}), l=1,\dots,L_{UL}. \qquad (6)$$

Hence, the $l^{th}$, l=1, ..., $L_{UL}$, MCS level and its corresponding $K_l$ are stored in the memory of the BS. For each RB, the BS could determine the highest MCS level and the corresponding maximal number of multiplexed UE multiplexed according to their relation determined by (6).

For the downlink data transmission, supposing that the number of transmitting antenna is M and the number of UE multiplexed on the current RB is K, three methods to combat the approximation error are presented below.

Method-1

A minimal truncation order $N_{min}$, $N_{min} \leq 4$, of NS is configured in the BS. When the BS computes the precoding matrix of these K UEs on a specific RB, it first finds the maximal MCS of these K UEs, which is denoted by $MCS_{max}$. Then, it compares the minimal required SINR for $MCS_{max}$ denoted by $SINR_{MCS\ max}$ and $SIR_{N_{min}}(M,K)$. If $SINR_{MCS\ max} \leq SIR_{N_{min}}(M,K)$, the BS would adopt $N_{min}$ for NS on the current RB. Otherwise, the BS would find the minimal N, $N \leq 4$, so that $SINR_{MCS\ max} \leq SIR_N(M,K)$. If the number of N that satisfies the condition cannot be found, the BS would choose N=8.

Method-2

For example, let $CQI_k$ denote the linear CQI value of the $k^{th}$ UE before modified, then the BS modifies it to $CQI_k^{New}$ according to the following formula $$CQI_k^{New} = \frac{CQI_k \times SIR_N(M, K)}{CQI_k + SIR_N(M, K)}, k = 1, \dots, K \qquad (7)$$

where M and K denote the number of transmitting antennas at the BS and the number of UEs multiplexed on a RB respectively. Finally, the BS selects the MCS for the $k^{th}$ UE according to $CQI_k^{New}$.

Method-3

A fixed value of truncation order N is configured for NS in the BS. For each allowable MCS in the downlink transmission, the maximal number of UEs multiplexed on a RB is calculated off-line and stored in the memory of the BS. For example, assuming a total of $L_{DL}$ MCS levels in the downlink transmission of a wireless communication system, for the $l^{th}$ MCS, the minimal required SINR for the system specified BLER is $SINR_l^{min}$, then the maximum number of multiplexed UEs can be computed as $$K_l = \arg \max_k (SIR_N(M,k) \geq SINR_l^{min}), l=1,\ldots,L_{DL}. \quad (8)$$

Hence, the $l^{th}$, $l=1,\ldots,L_{DL}$ MCS level and its corresponding $K_l$ are stored in a table. For each RB, the BS could determine the highest MCS level and the corresponding maximal number of multiplexed UE according to the relation determined by (8).

Another embodiment provides a method to estimate the probability of convergence of NS in calculating the AIM. Given the number of BS antennas M, this estimate can be used to determine the maximum number of served UEs K for the NS-based AIM to be a valid method in massive MIMO systems. One of such estimates is given as $$\frac{M}{K} > 5.83$$

which indicates that the NS-based AIM has very high convergence probability.

A tighter condition for $G=\hat{H}^H\hat{H}$ to be a Diagonally Dominant Matrix (DDM) in very high probability, resulting in a good NS-based AIM with a small number of N, is given as $$\frac{M}{K} > \frac{M[E(x) + \delta(x)]}{E(x) + \delta(x) + 1} \quad (9)$$

where $E(x)=(M-1)B(1.5, M-1)$ and $\delta(x)=\sqrt{E(x^2)-E(x)^2}$ with $E(x^2)=(M-1)B(2, M-1)$. The function $B(a,b)$ with a and b being complex-valued numbers is the beta function defined as $$B(a,b) = \int_0^1 t^{a-1}(1-t)^{b-1} dt, \Re\{a\}, \Re\{b\} > 0.$$

This condition can be used to determine the maximum number of served UEs K given the number of BS antennas M for the NS-based AIM to achieve good performance and quick convergence, i.e., with small N, for ZF decoding or detection.

Figure 3:
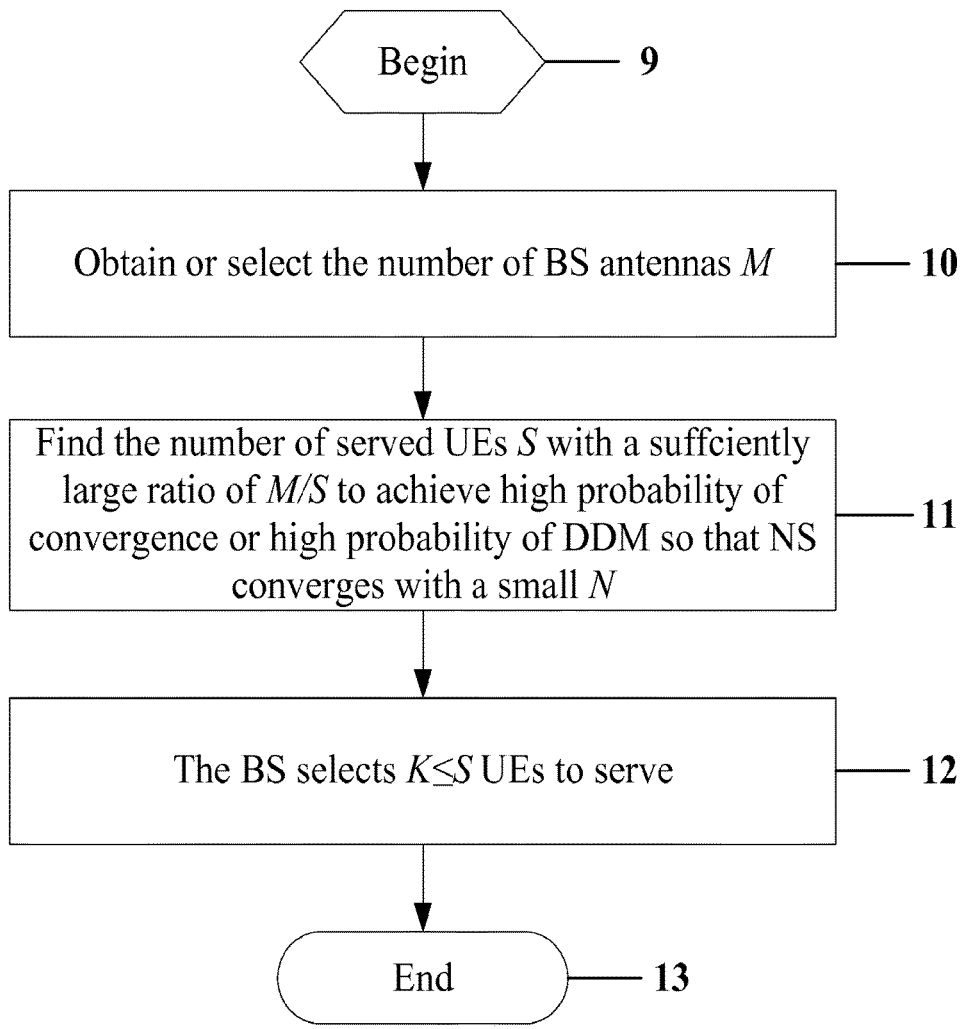
FIG. 3 shows the flowchart for determining the number of served UEs K for a given M.

FIG. 3 shows the flowchart for determining the number of served UEs K, for a given M, to ensure high probability of convergence and/or quick convergence. The process begins 9 when the number of BS antennas M is selected or obtained 10. Then, the number of served UEs S is found with a sufficiently large ratio of M/S to achieve high probability of convergence or high probability of DDM so that NS converges with a small N 11. After that, the BS selects K≤S UEs to serve 12 before the process ends 13.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What are claimed are:

1. A method for link adaption in a wireless communication system comprising
    a Base Station (BS) calculating the Signal-to-Interference Ratio (SIRs) caused by a Multi-User Multiple Inputs Multiple Outputs (MU-MIMO) precoding matrix obtained using an approximation, wherein the BS has multiple antennas to operate for MU-MIMO and the number of antennas the BS uses to serve User Equipment (UEs) in a Resource Block (RB) in a MU-MIMO group is larger than the number of the spatial multiplexed UEs;
    using the SIRs, the BS selecting an accuracy level of approximation needed of the precoding matrix;
    the BS obtaining a precoding matrix with the selected accuracy level of approximation;
    the BS determining the number of UEs in a MU-MIMO group; and
    the BS using the precoding matrix in the MU-MIMO communication with the determined number of UEs in the MU-MIMO group.

2. The method in claim 1 further comprising the BS selecting a desired Modulation and Coding Scheme (MCS) for a MU-MIMO group.

3. The method in claim 2 wherein the desired MCS is the maximum MCS.

4. The method in claim 1 wherein the approximation includes the computation of an Approximate Inverse Matrix (AIM).

5. The method in claim 4 wherein an accuracy level of the approximation is determined by the order of truncation in the computation of an AIM.

6. The method in claim 5 further comprising a minimal truncation order $N_{min}$ being pre-defined at the BS as the following steps: the BS first calculates the required signal-to-interference-plus-noise ratio (SINR) denoted by $SINR_{max}$ corresponding to the maximum MCS of a MU-MIMO group in a specific resource block; then, the BS compares the SIR denoted by $SIR_{max}$ corresponding to $N_{min}$ and $SINR_{max}$; if $SIR_{max} \geq SINR_{max}$, the BS chooses the truncation order as $N_{min}$; otherwise, the BS chooses the truncation order that the corresponding SIR is no less than $SINR_{max}$; if no one truncation order can be find to satisfy the condition that the corresponding SIR is no less than $SINR_{max}$, the BS chooses the truncation order as $2N_{max}$.

7. The method in claim 1 further comprising being applied to both the uplink and downlink transmission in wireless communication systems.

8. The method in claim 1 further comprising being applied to a Frequency Division Duplex (FDD) wireless communication system.

9. The method in claim 1 further comprising being applied to a Time Division Duplex (TDD) wireless communication system.

10. The method in claim 1 further comprising the BS calculating the SIRs corresponding to different numbers of UEs in a MU-MIMO group.

11. The method in claim 1 further comprising the BS calculating the SIRs corresponding to different accuracy levels of approximation.

12. The method in claim 11 further comprising the SIRs associated with truncation orders no more than $N_{max}$ being pre-calculated and stored in the memory of the BS and being recalled when needed.

13. The method in claim 1 further comprising the BS modifying the CQI of a UE with the SIR caused by the approximation and selecting the MCS for a UE with the modified CQI.

14. The method in claim 1 further comprising the BS determining the maximum number of UEs in a MU-MIMO group for each MCS level for a pre-defined accuracy level of approximation.

15. The method in claim 14 further comprising the BS selecting the number of UEs in a MU-MEMO group so that the SIR corresponding to the chosen number is larger than the required SINR corresponding to a MCS level.

16. The method in claim 1 further comprising the BS determining the maximum number of UEs in a MU-MIMO group by calculating the ratio between the number of BS antennas and the number of UEs in a MU-MIMO group so that the ratio is no more than a specific value.

17. The method in claim 16 further comprising the specific value being determined by a pre-defined fixed value or $$\frac{M[E(x)+\delta(x)]}{E(x)+\delta(x)+1}$$

where $E(x)=(M-1)B(1.5, M-1)$ and $\delta(x)=\sqrt{E(x^2)-E(x)^2}$ with $E(x^2)=(M-1)B(2, M-1)$, and the function $B(a,b)$ with a and b being complex-valued numbers is the beta function defined as $$B(a,b)=\int_0^1 t^{a-1}(1-t)^{b-1}dt, \Re\{a\}, \Re\{b\}>0.$$

* * * * *